(12) United States Patent
Menjak et al.

(10) Patent No.: US 7,383,750 B2
(45) Date of Patent: Jun. 10, 2008

(54) DOUBLE FLANK DELASH GEAR MECHANISM

(75) Inventors: Ratko Menjak, Frankenmuth, MI (US); Michael J. Augustine, Mayville, MI (US); David E. King, Freeland, MI (US); Neil T. Beyersdorf, Saginaw, MI (US); Michael R. Pyrett, Davison, MI (US); Thomas J. Bucholz, Sanford, MI (US); Charles W. Calvin, Midland, MI (US); James P. Kelly, Saginaw, MI (US); George S. Frahm, Reese, MI (US)

(73) Assignee: Delphi Technologies, Inc., Troy, MI (US)

( * ) Notice: Subject to any disclaimer, the term of this patent is extended or adjusted under 35 U.S.C. 154(b) by 539 days.

(21) Appl. No.: 10/868,612

(22) Filed: Jun. 15, 2004

(65) Prior Publication Data

US 2004/0253912 A1 Dec. 16, 2004

Related U.S. Application Data

(60) Provisional application No. 60/479,751, filed on Jun. 18, 2003, provisional application No. 60/479,167, filed on Jun. 16, 2003.

(51) Int. Cl.
*F16H 57/12* (2006.01)
(52) U.S. Cl. .............................. 74/409; 74/440; 74/443
(58) Field of Classification Search ................... 74/409, 74/440, 443, 444
See application file for complete search history.

(56) References Cited

U.S. PATENT DOCUMENTS 1,440,907 A 1/1923 Brown et al.
2,069,433 A 2/1937 Wildhaber (Continued)

FOREIGN PATENT DOCUMENTS

AU 647287 3/1994

(Continued)

OTHER PUBLICATIONS

Lynwander, Peter, "Gear Drive Systems Design and Application", American Lohmann Corporation, Marcel Dekker, Inc., 1983.

(Continued)

*Primary Examiner*—William C Joyce
(74) *Attorney, Agent, or Firm*—Michael D. Smith

(57) ABSTRACT

A gear arrangement includes a first section having a first plurality of teeth and at least a portion of the first section is made of a compliant material. There is also a second section having a second plurality of teeth. The second section is made of a stiff material. The first section is arranged axially adjacent to the second section and each of the first plurality of teeth has a tooth flank that changes axially across the tooth flank. A method for manufacturing a gear arrangement includes fabricating a first gear, which includes a first plurality of teeth, and a bearing from a compliant material. The method also includes mounting a second gear, which includes a second plurality of teeth, to the bearing, aligning the first plurality of teeth with the second plurality of teeth, and coupling the first gear with the second gear.

15 Claims, 6 Drawing Sheets

U.S. PATENT DOCUMENTS

| | | |
|---|---|---|
| 2,669,128 A | 2/1954 | Steiner |
| 2,760,381 A | 8/1956 | Pickles |
| 2,764,034 A | 9/1956 | Hotine |
| 2,935,887 A | 5/1960 | Wildhaber |
| 3,122,938 A | 3/1964 | Visser |
| 3,176,534 A | 4/1965 | Rice et al. |
| 3,386,305 A | 6/1968 | Wildhaber |
| 3,472,092 A | 10/1969 | Doolittle et al. |
| 3,605,513 A | 9/1971 | Sugimoto |
| 3,719,103 A | 3/1973 | Streander |
| 4,047,449 A | 9/1977 | Popov |
| 4,519,264 A * | 5/1985 | Inui .............................. 74/409 |
| 4,541,296 A | 9/1985 | Oyafuso |

FOREIGN PATENT DOCUMENTS

| | | |
|---|---|---|
| GB | 2 224 805 | 5/1990 |
| JP | 61105366 | 5/1986 |

OTHER PUBLICATIONS

Towsend, Dennis P. "Dudley's Gear Handbook" Lewis Research Center, NASA, McGraw-Hill, Inc., Second Edition, undated.

* cited by examiner

DOUBLE FLANK DELASH GEAR MECHANISM

CROSS-REFERENCE TO RELATED APPLICATIONS

The present application claims the benefit of the date of the earlier filed provisional applications, having U.S. Provisional Application No. 60/479,167, filed on Jun. 16, 2003 and U.S. Provisional Application No. 60/479,751, filed on Jun. 18, 2003, both of which are incorporated herein in their entirety.

BACKGROUND OF THE INVENTION

This disclosure relates to the delashing of gear assemblies.

Gear assemblies typically comprise a drivable gear (e.g., a first spur gear) engaged by a pinion (e.g., a second spur gear). Due to the manufacturing process, there are always some imperfections in the manufacturing of the teeth of the gears. Because of these imperfections, a clearance is maintained between the teeth of the driveable gear and the teeth of the pinion when the two gears are engaged. This clearance, which is also known as backlash, permits relative motion between the drivable gear and the pinion. If the clearance were not maintained, load bearing gears would not be able to operate because the meshing of the teeth between the gears would become so tight (due to the imperfections) that, even absent any deflection of the teeth, the gears would bind and cause the gear assembly to jam. In a gear system with any degree of backlash, in many applications, an audible noise is produced by the movement of the teeth of one gear through applicable backlash and into contact with the teeth of the other gear. Backlash also results in lost motion when one gear is turned through the backlash with no transmission of motion or torque to a second gear.

In the design and manufacture of compact, bi-rotational gearboxes, a first spur gear is engaged with a second spur gear. Both gears are typically fabricated from metal and are configured such that the teeth of the first spur gear are aligned with spaces defined by the teeth of the second spur gear. The teeth of the first spur gear are usually aligned with spaces defined by the teeth of the second spur gear such that a clearance exists in the meshing of the teeth of each gear. Furthermore, because of the high stiffness of the metallic teeth, the surfaces of the flanks, and the need to maintain the clearance, one flank surface of each tooth of the pinion engages one flank surface of each tooth of the driven gear to result in single flank contact. Systems using single flank contact typically employ a contact area uniformly distributed across the surfaces of the engaged flanks. The uniformly distributed contact area, in conjunction with the clearance between the engaged teeth, is a factor that contributes to the audible noise produced during the driving of the first spur gear by the second spur gear. In addition, there is also audible noise during periods when the rotational direction of the first spur gear is reversed to reverse the direction of rotation of the second spur gear.

Such noise, although not indicative of a defect in the gear assembly, generally proves to be undesirable, especially when the gear assembly is located within or in communication with the passenger compartment of a motor vehicle. In addition, there is also vibrational feedback that may occur from the driven portion back to the driving portion. This vibrational feedback can set up a resonance in the steering system. Thus, because of the backlash in the gear assembly, there can be a resonance or rattle felt by the driver at the hand wheel.

The reduction of backlash and the minimization of noise have been achieved in worm gear assemblies. In such assemblies, the worm gear is made completely of a polymer element. Such an arrangement in the worm gear assembly is preferable due to the complexity of the gear and also because the load is not as high as with the spur gear assembly. Thus, when a gear is made completely of a compliant material, such as the worm gear, those gears are limited as to the amount of load that the gear can handle. It is desirable for spur gear assemblies to carry higher loads than is usually carried by worm gears and thus, it may not be desirable to have a spur gear made completely from a compliant material.

The reduction of backlash and the minimization of noise have been achieved in the related art of instrument gearing. In that type of gearing, backlash has been minimized through the use of split gears, which typically comprise two gear halves mounted side-by-side and wherein each gear half includes a plurality of teeth. A spring is positioned between each gear half to bias each gear half in opposing rotational directions. The opposing rotational directions cause flank surface contact to be maintained between a tooth on one of the gear halves and a tooth of a gear with which the split gear is in contact while simultaneously causing flank surface contact to be maintained between the aligned tooth on the other of the gear halves and an opposing flank surface of the tooth of the gear with which the split gear is in contact.

Such a structure allows for double flank surface contact to be maintained between successive teeth in a gear set, which reduces or eliminates backlash in the gear set, thereby minimizing noise and lost motion. However, because of the deflection of the spring, both the contact force and the size of the contact area maintained by the teeth of the split gear on the successive teeth of the gear with which the split gear is in contact remain constant regardless of the load imposed on the gear set. The force and contact area size cause the contact pressure to vary, which thereby causes frictional forces to be experienced by the gear flank surfaces as the load varies. Such frictional forces in turn cause a constant degradation of performance within the gear set. Moreover, such instrument gearing is generally used to indicate a position of one element with respect to another; however, instrument gearing cannot bear a significant load.

In addition, instrument gearing usually operates only in one direction and thus, instrument gearing generally does not have a problem with position feedback. Position feedback occurs when a system that operates in both a first and second direction and compliant in the first direction than in the second direction. This position feedback poses a problem with the electronics because the electronics do not like to be biased in that way.

In addition, gears generally also require some sort of bearing or bearing surface on which to rotate. Components that serve more than one function should be employed whenever possible in the interests of compactness and simplicity.

SUMMARY OF THE INVENTION

Exemplary embodiments of a gear arrangement include a first section having a first plurality of teeth and at least a portion of the first section is made of a compliant material. There is also a second section having a second plurality of teeth. The second section is made of a stiff material. The first section is arranged axially adjacent to the second section and each of the first plurality of teeth has a tooth flank that changes axially across the tooth flank.

Further exemplary embodiments of a gear arrangement include a first section has a first plurality of teeth with at least a portion of the first section made of a compliant material. A second section has a second plurality of teeth. The second section is made of a stiff material. The first section is arranged axially adjacent to the second section so that the first plurality of teeth align with the second plurality of teeth. A mounting piece is disposed at an axis of rotation of the first section and the second section. The first section is coupled to the mounting piece, and the second section is mounted on the second section.

Additional exemplary embodiments of a method for manufacturing a gear arrangement includes fabricating a first gear, which includes a first plurality of teeth, and a bearing from a compliant material. The method also includes mounting a second gear, which includes a second plurality of teeth, to the bearing, aligning the first plurality of teeth with the second plurality of teeth, and coupling the first gear with the second gear.

Further exemplary embodiments of a method for manufacturing a delashing gear system includes combining a plastic blank and a metal blank to create a combined structure. After the combining step, teeth are cut in the combined structure, along a length of the combined structure so that the teeth are created and aligned in both the plastic blank and the metal blank. At said plastic blank, a tooth flank is changed in an axial direction across a tooth flank.

DESCRIPTION OF THE PREFERRED EMBODIMENT

Figure 1:
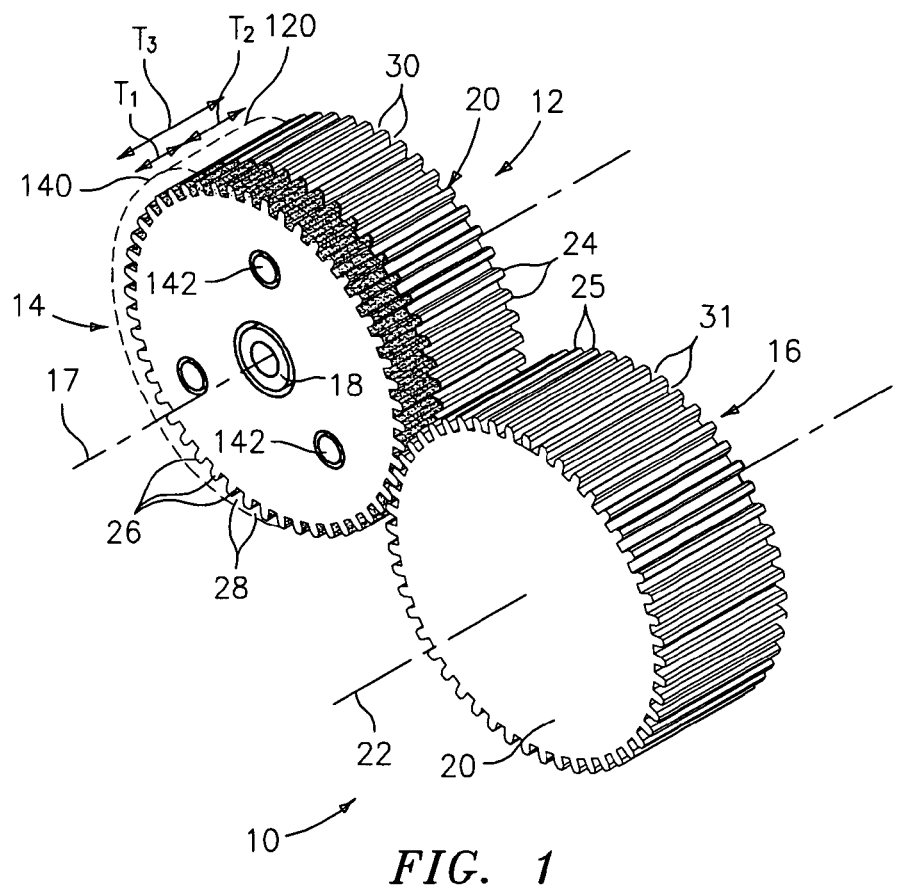
FIG. 1 is a perspective view of first and second spur gears in mating relationship wherein the first spur gear includes a delash gear coaxially aligned therewith in compressive engagement with a portion of the second spur.

Referring to FIG. 1, a spur gear assembly is shown generally at 10. Spur gear assembly 10 is directionally reversible and comprises a first spur gear, shown generally at 12, a delash gear 14 coaxially aligned therewith and a second spur gear, shown generally at 16 disposed relative to each other such that the teeth of delash gear 14 and second spur gear 16 (described below) are arranged in an intermeshing double flank contacting relationship. First spur gear 12 and delash gear 14 are supported at respective ends and are mounted so as to define a longitudinal axis of rotation 17 along a length thereof. First spur gear 12 and delash gear 14 may also be mounted on a bearing 18, which may be made of any suitable bearing material. However, it is also noted that bearing 18 is not required if first spur gear 12 is made from a suitable material, which can be used as a bearing, such as cast iron.

Second spur gear 16 includes a body portion 20 mounted and supported at its geometric center to define an axis of rotation 22 therethrough. In spur gear assembly 10, axis of rotation 22 is substantially parallel to axis of rotation 17.

It should be noted that although a spur gear assembly is described herein, the present invention is not limited to spur gear assemblies, as other gear mechanisms and/or assemblies are contemplated, including, but not limited to, helical gear assemblies, for example.

Figure 2:
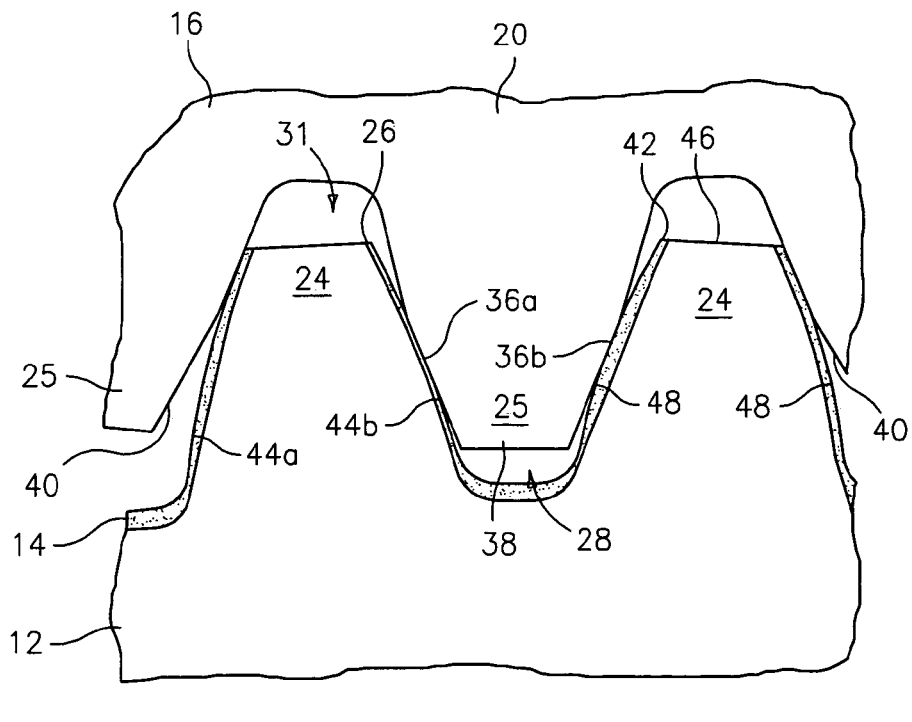
FIG. 2 is an enlarged partial side view of FIG. 1 illustrating the teeth of first spur gear and delash gear engaged with the teeth of second spur gear the space therebetween.
Figure 3:
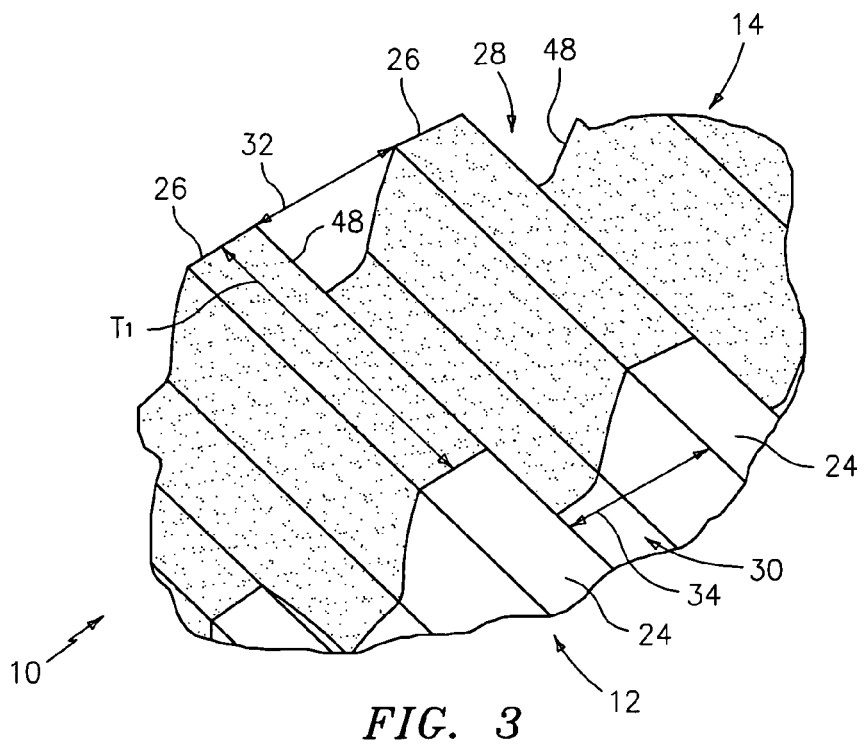
FIG. 3 is an enlarged partial top perspective view of FIG. 1 illustrating the teeth of the first spur gear and delash gear respectively aligned with each other.

Both first and second spur gears 12 and 16 are made from a stiff material, such as metal. First spur gear 12 includes a plurality of teeth 24 and second spur gear 16 includes a plurality of teeth 25. Delash gear 14 includes a plurality of teeth, shown generally at 26, protruding from an edge thereof to define a plurality of spaces 28. Likewise, the plurality of teeth 24, 25 of first and second spur gears 12 and 16 define a plurality of spaces 30, 31, respectively. Referring to FIGS. 2 and 3, each space 28 of the plurality of spaces 28 is narrower than each space 30 of the plurality of spaces 30. In other words, a first distance 32 between contiguous teeth 26 of delash gear 14 is shorter than a second distance 34 between contiguous teeth 24 of first spur gear 12. It is noted that when first spur gear 12 is coaxially aligned with delash gear 14, plurality of teeth 24 align with plurality of teeth 26.

Although delash gear 14 is referred to hereinafter as being fabricated from a relatively compliant material (as compared to the stiff material), which is referred to hereinafter as a compliant material. It should be understood that any of the following may be made of the compliant material: (1) both the body portion and respective teeth; (2) just the teeth; or (3) just a portion of the teeth. In any of these instances, the compliant material facilitates the flexing of teeth 26 with respect to second spur gear 16 during the operation of spur gear assembly 10. In addition, bearing 18 may also be made of the compliant material. The compliant material is relatively compliant material in that the material may be a polyamide, a nylon, or other like material. In an exemplary embodiment, PolyEtherEtherKetone (PEEK) is utilized for its known high temperature properties and or high temperature resiliency. However, other compliant materials are contemplated for use in delash gear, as long as the chosen material provides relatively compliant teeth 26.

Referring now to FIG. 2, a pair of teeth 25 (i.e., one full tooth and two partial teeth) of second spur gear 16 and space 31 defined therebetween is shown. Each tooth 25 is contiguously formed with body portion 20 and comprises opposing flanks, shown generally at 36a and 36b, extending away from body portion 20 and a tip 38 extending between flanks 36a, 36b of each tooth 25 at points most distal from body portion 20.

Each opposing flank 36a, 36b is arcuately formed and convexly oriented relative to its corresponding tooth 25. The surface of each flank 36a, 36b is uninterrupted and comprises outboard portions 40. Outboard portions 40 correspond with the portions of flanks 36a, 36b positioned at the outer edges of second spur gear 16 and serve as contact surfaces for the flanks of the compliant teeth of the delash gear 14 when second spur gear 16 is engaged by the delash gear 14 and first spur gear 12 combination.

Referring still to FIG. 2, a pair of outboard portions 42 of teeth 26 of delash gear 14 are shown extending from profiles of two teeth 24 of first spur gear 12. Teeth 24 of the first spur gear 12, like the teeth 25 of the second spur gear 16, are contiguously formed with a body portion 20 and comprise opposing flanks, shown generally at 44a and 44b and a tip 46 extending between each flank 44a, 44b. In addition, while tip 46 is illustrated as being approximately the same height as tip 38, tip 46 may extend above tip 38 are may extend below tip 38, depending on the application.

Each opposing flank 44a, 44b is arcuately formed and convexly oriented relative to its corresponding tooth 24. In a manner similar to that of the second spur gear 16, the surface of each flank 44a, 44b is uninterrupted and comprises outboard portions 48. Outboard portions 48 correspond with the portions of flanks 44a, 44b positioned at the outer edges of first spur gear 12 and serve as contact surfaces for the flanks of the teeth of the second spur gear when first spur gear 12 compressively engages the second spur gear 16. Outboard portions 48 reduce the lash of the spur gear assembly 10 by increasing the friction therebetween at only a portion of the total surface area defined by outboard portions 40 of second spur gear 16.

Referring to FIGS. 1, 2, and 3, spur gear assembly 10 is delashed when both delash gear 14 and second spur gear 16 are properly compressively engaged with each other. During proper compressive engagement, which is typically about 50 microns to about 100 microns, teeth 26 of delash gear 14 are flexible relative to teeth 25 of second spur gear 16. This flexibility is a function of the resiliency defined by the nature of the material of fabrication of delash gear 14 and the spring rate associated with tooth 26. The spring rate, in turn, is a function of the architecture of tooth 26, which may be defined at least in part by the convexity of flanks 44a, 44b. The particular geometries involved cause the spring rate to be variable, increasing and decreasing in smooth manners upon deflection of tooth 26. Because of such flexibility, contact is maintainable between outboard portions 40 of teeth 25 of second gear 16 and outboard portions 48 of teeth 26 of delash gear 14 at low- or no-load conditions without binding. The compliancy and flexibility are maintained at high load conditions because the mating of stiff teeth 24, 25 of gears 12 and 16 absorb the load as opposed to compliant teeth 26 of delash gear 14. Such contact is hereinafter referred to as "double flank" contact. Although double flank contact would normally result in the jamming or binding of the gears when both gears are fabricated of metal or some other substantially inflexible material, double flank contact in spur gear assembly 10, because of the resiliency of the material of fabrication and spring rate of tooth 26 itself, allows spur gear assembly 10 to function without jamming or binding.

By maintaining double flank contact at low- or no-load conditions, spur gear assembly 10 can be operated so as to effectively eliminate audible noise and feedback due to a reversal of the rotation of first spur gear 12 to drive second spur gear 16 in an opposing direction. In spur gear assembly 10, such an operation does not necessitate the contact of two non-contacting teeth, which would otherwise generate noise. Without double flank contact, a reversal of the rotation of first spur 12 to drive second spur gear 14 in an opposing direction causes the delash gear teeth 26 to move through the backlash space and then contact an opposing flank surface of second spur gear 16 to result in an audible noise and distortional feedback being transmitted to the operator of the motor vehicle through the steering device. Any distortional feedback, which is essentially a "shock load" imposed on the system, excites all frequencies of the system and is, therefore, magnified. The variability of the spring rate discussed above and due to the material of fabrication and tooth architecture acts as a shock absorber and makes the distortional feedback transparent to the operator. Additionally, the flexibility of the material allows only a minimum amount of turning torque to exist within spur gear assembly 10, which in turn allows the road feel to be sensed by the operator of the motor vehicle.

By causing double flank contact to occur in a gear set having at least a portion of one gear manufactured of a compliant material in conjunction with the gear geometries disclosed herein, turning torque is kept to a minimum, rattle within the spur gear assembly is minimized, lash is eliminated, and the gear set is audibly quiet. By delivering all three attributes, performance of a gear set is enhanced and significant benefit to the art is provided.

Referring now to FIG. 1, manufacture of first spur gear 12 and delash gear 14 will be described. In an exemplary embodiment, a delash blank 140 and first spur blank 120 (both shown in phantom) are assembled to each other using mechanical fasteners 142, three shown for example, however, other fastening methods are contemplated including, mechanical and chemical means. A thickness T1 of blank 140 combined with a thickness T2 of blank 120 combine to a thickness T3 corresponding to a thickness of second spur gear 16. The relationship between T1 and T2 depend on the desired friction and resiliency in spur gear assembly 10. The relationship between T1 and T2 further depends on the magnitude of the anticipated loads between first and second gears 12 and 14, such that at higher loads, T2 will increase with respect to T1 to accept such higher loads and prevent further deflection of teeth 26 of the delash gear. At lower loads, T1 will increase with respect to T2 to provide improved delash between the gears. Thus, T1 and T2 may be customized to the specific application.

After blanks 120 and 140 are assembled, a hob cutter (not shown) is relieved to first cut teeth 26 of delash gear 14 along a length represented by T1 and then the hob cutter is employed to cut teeth 24 in blank 120 to form the first spur gear 12 corresponding to a length of T2. As it will be recognized, by relieving the hob cutter or pressure applied by the hob cutter against the compliant blank 140, teeth 26 have a profile that is slightly larger than a profile of teeth 24 on the metal blank 120 portion (See FIG. 2). It will also be noted that teeth 26 may have a constant profile throughout a length represented by T1 or more preferably includes a higher tooth profile at a free face of delash gear 14 that tapers down to a tooth profile cut in teeth 24 of first spur gear 12. However, any tooth profile is contemplated along a length represented by T1 and/or T2 depending on the application of gear assembly 10. In another embodiment, the tooth profile cut into teeth 26 may include one or more reliefs cut along a length T1 to provide an avenue for deflection of such teeth at higher loads. In one embodiment, a relief or flange may be cut proximate a free face of delash gear to allow deflection of teeth 26 toward the relief at higher loads.

In another embodiment, teeth 24 may be separately cut in blank 120 and teeth 26 may be separately cut or molded for delash gear 14 and then later coaxially aligned with first spur gear 12 for assembly therewith. However, it will be recognized that by first joining blanks 120 and 140 before using the hob cutter, later manual alignment between delash and first spur gears can be avoided. In addition, it should be noted that the metal teeth 24 may optionally cut first before relieving the hob cutter to cut teeth 26, however, metal from the metal teeth tends to migrate into the plastic cut teeth 26.

Referring to FIGS. 8a-8g, various arrangements of top views of tooth 24 abutting tooth 26 are illustrated. It will be understood that there are many additional arrangements that are not shown and that the various arrangements that are shown are for illustrative purposes only. In particular, tooth flanks 44a, 44b can change axially across tooth flanks 44a, 44b so that the thickness of the tooth is changed, the helix angle is changed, or there is a combination of both the thickness of the tooth changing and the helix angle changing. FIGS. 8a-g represent only a portion of the various embodiments that are included with having tooth flanks 44a, 44b change axially across tooth flanks 44a, 44b. In each view, tooth 26 is shown having tooth flanks 44a, 44b that change axially such that a tooth thickness changes across tooth flanks 44a, 44b. The transition in tooth 26 allows for gears 12 and 14 to axially slide into engagement with gear 16 without damaging delash gear 14. If there was no transition, then it would very difficult to axially slide the gears into engagement and gears would be engaged in a radial manner. By having transition along the tooth flank, there is no sudden change in the width of the tooth 26 as compared to tooth 24, which allows for the gears to mate in a sliding axial manner.

Moreover, the tooth transition also allows for changing the compliant behavior of the combined gears 12 and 14 and also to improve the life for delash gear 14. For instance, referring to FIG. 8a, the shape of tooth 26 allows tooth 26 to operate in a torsional manner. As such, there is less compression required on delash gear 14 and the wear and stress characteristics of tooth 26 are improved. In addition, as shown in FIG. 8e, the curviture along the tooth flank allows the load to be spread over a larger area, then one in which the change in the tooth flank is more pointed. In doing so, the life of delash gear 14 can be improved since there will be less wear along the tooth flank.

In addition, the manufacturing of change in tooth flanks 44a, 44b of delash gear 14 can be accomplished in a variety of ways. First, delash gear 14 may be machined from a bar of stock. Second, plurality of teeth 26 of delash gear 14 may be machined. Third, delash gear 14 may be a molded item.

FIGS. 8a-8g each illustrate cross-section views of a top of a single tooth 24 of first spur gear 12 and a single tooth 26 of delash gear 14. It would also be helpful to continue to refer to FIGS. 1 and 2 for context.

Figure 8A:
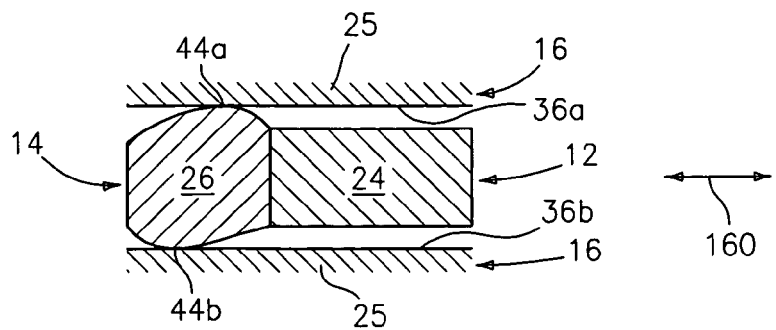
FIGS. 8a-8g are alternative embodiments of a cross-section through a top of a tooth of a delash gear mated against a tooth of a second spur gear.
Figure 8B:
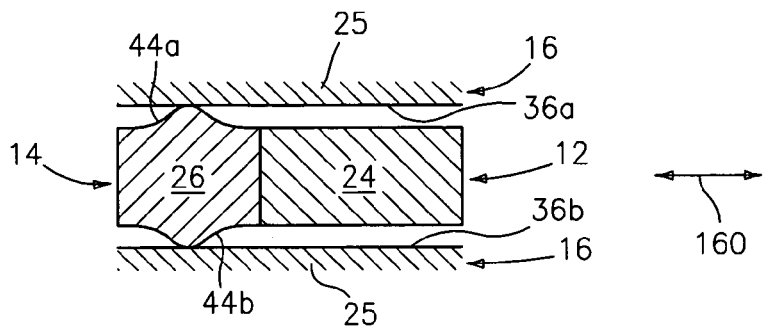
Figure 8C:
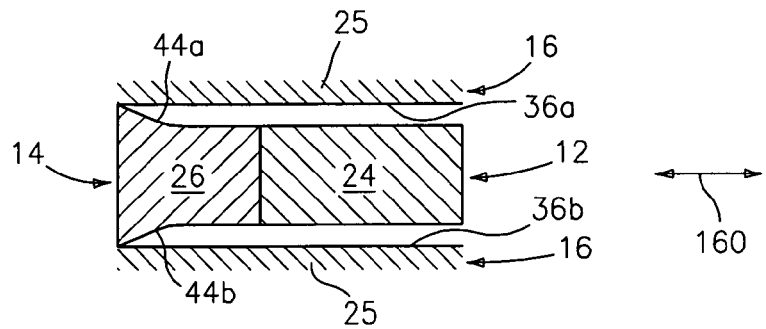
Figure 8D:
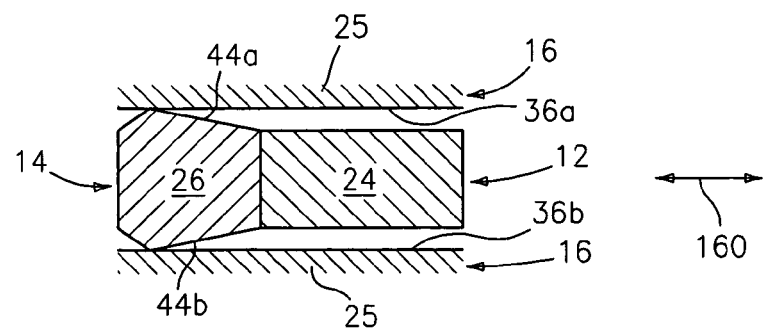
Figure 8E:
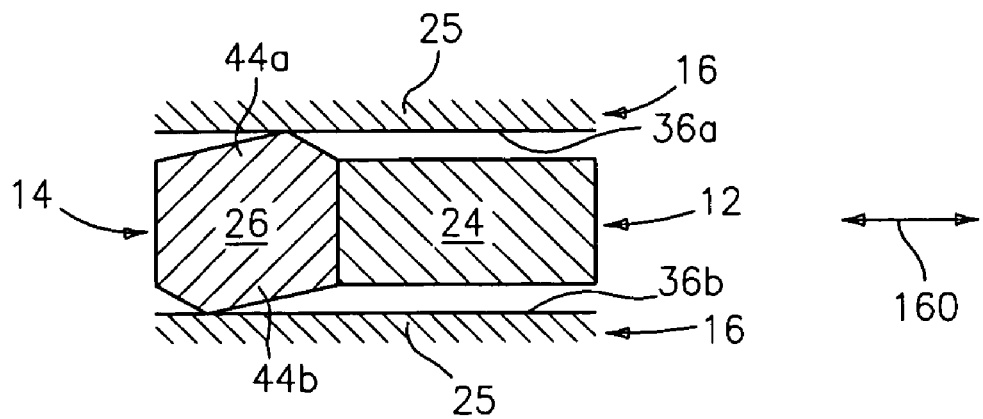

FIG. 8a illustrates tooth 24 abutting tooth 26, with tooth 26 having a curved shape along an axial direction 160 of tooth flanks 44a, 44b and also a change in helix angle along axial direction 160 tooth flanks 44a, 44b. FIG. 8b illustrates tooth 24 abutting tooth 26, with tooth 26 increasing curvilinear in thickness and then similarly decreasing in thickness. The maximum width occurring approximately at a center of the tooth flank or biased towards either side. FIG. 8c illustrates tooth 24 abutting tooth 26, with tooth 26 increasing in thickness to a point. This is the embodiment done with hob cutter. FIG. 8d is similar to FIG. 8b, however, the tooth thickness change is linear. FIG. 8e is similar to FIG. 8a with both the thickness of the tooth 26 changes and helix angle tooth 26 changes; however, instead of the curve shape, the tooth has a polyhedral shape.

Figure 8F:
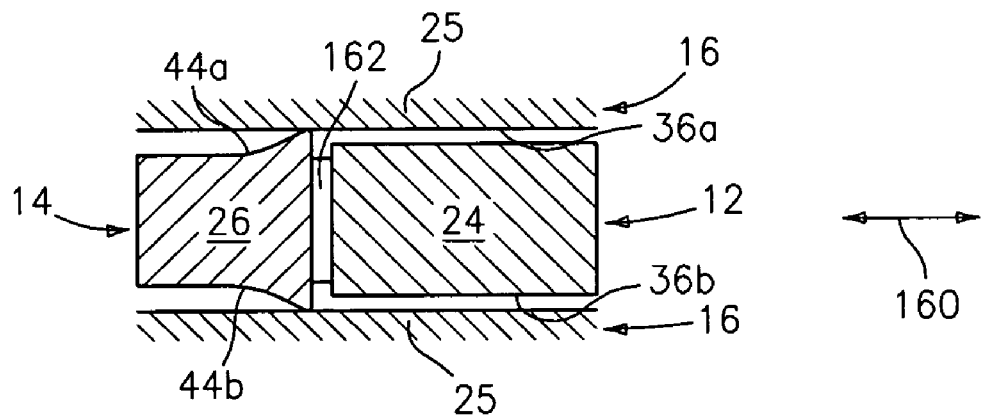

FIG. 8f illustrates a minor gap 162 or relief zone between tooth 24 and tooth 26. Because the thick portion of tooth 26 is constrained and cannot move in a vertical direction, gap 162 is an area in which the thick portion of tooth 26 can move when tooth flanks 44a, 44b are compressed by tooth flanks 36a, 36b. Gap 162 can be created in any manner, such as extending the hub on either gear 12 or delash gear 14, or providing a washer in between the two gears.

Figure 8G:
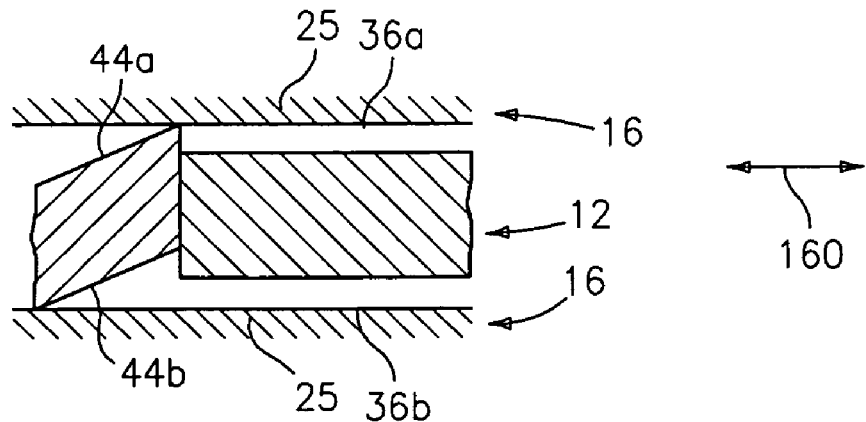

FIG. 8g illustrates tooth 26 abutting tooth 26 with a change in helix angle between tooth 24 and tooth 26. There is no difference in tooth thickness between tooth 24 and tooth 26; instead, the change across the tooth flanks 44a, 44b are caused only by the change in helix angle.

Figure 4:
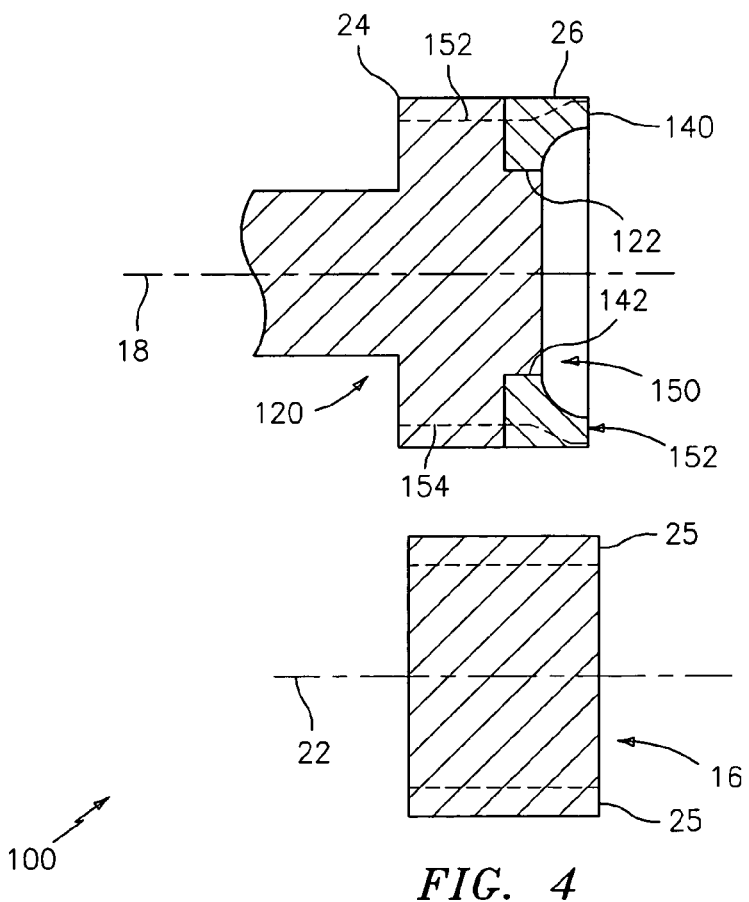
FIG. 4 is a cross section view of an alternative embodiment of a first spur gear and delash gear assembly having a relieved portion within the delash gear to provide increased delash and compliance with a mating gear.
Figure 5:
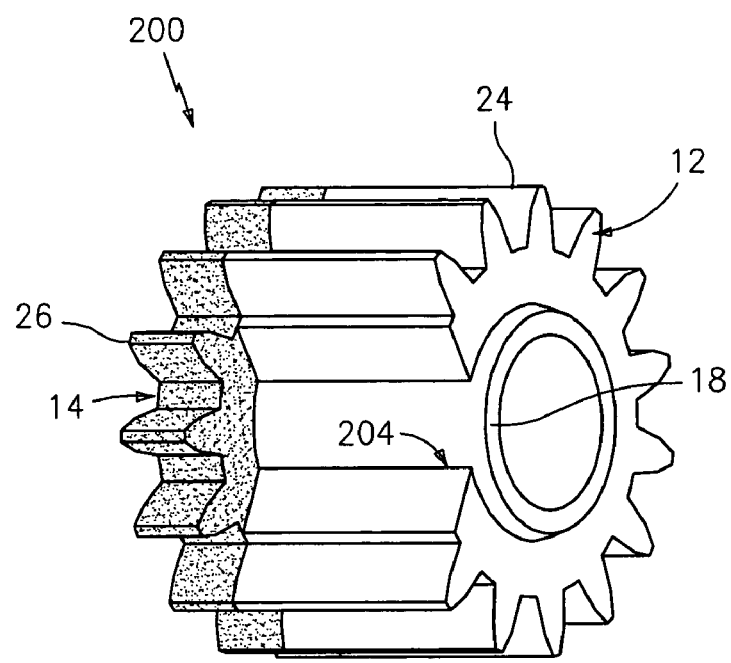
FIG. 5 is a perspective view of the integrated delash gear and bearing of FIG. 5 shown with a cutaway view of a spur gear mounted onto a sleeve of the bearing.
Figure 6:
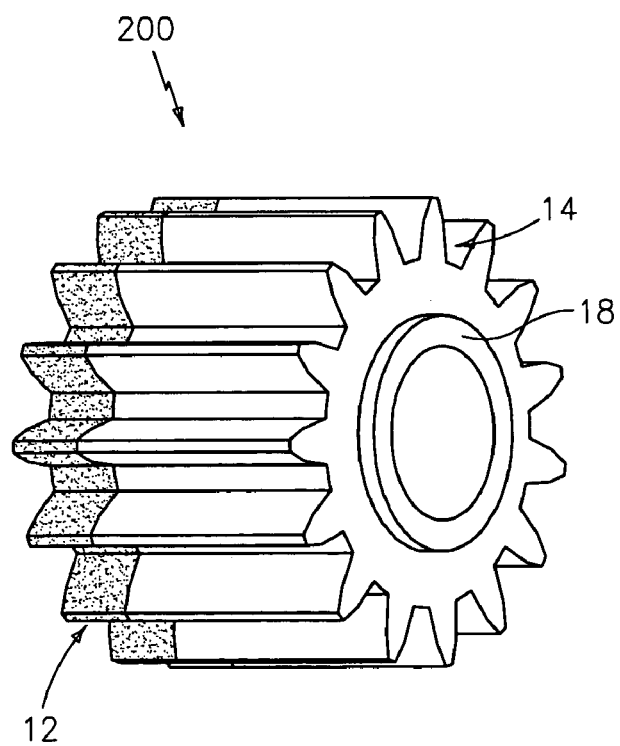
FIG. 6 is a perspective view of the integrated delash gear and bearing of FIG. 5 shown with the spur gear mounted onto the sleeve of the bearing.
Figure 7:
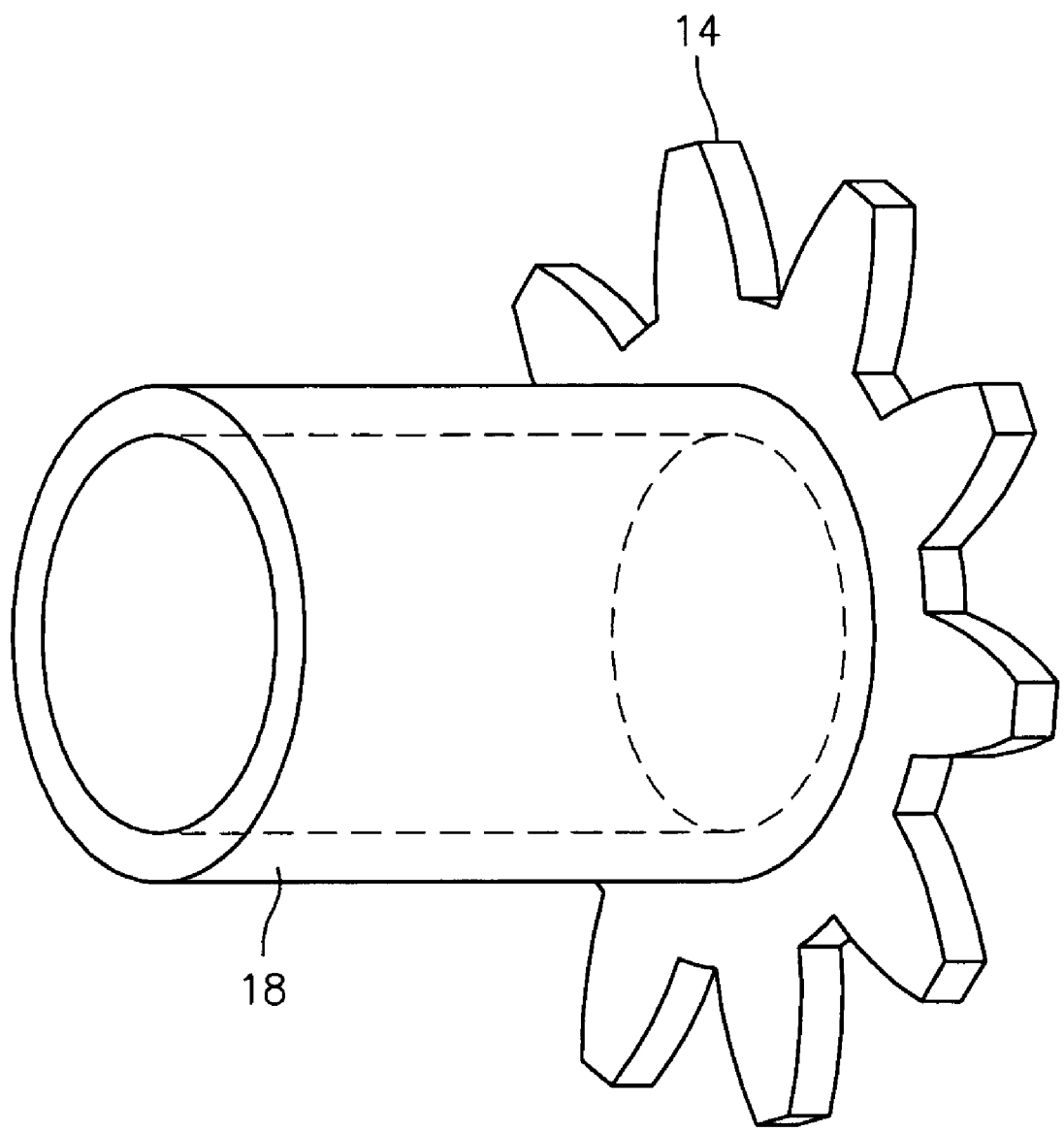
FIG. 7 is a front perspective view of an alternative embodiment of delash gear in which delash gear is integrated with a bearing.

Referring now to FIG. 4, an alternative embodiment of a spur gear assembly 10 is illustrated generally at 100. Gear assembly 100 includes a metal spur gear 16 in operable communication with a delash gear 140 and metal spur gear 120 combination configured substantially as described with reference to FIG. 1. It will be noted that the gear assembly 100 is illustrated with spur gear 16 in a non-engaged position for clarity.

Metal spur gear 120 includes a hub portion 122 extending therefrom to receive a complementary dimensioned hub 142 of delash gear 140 thereon or plastic blank to fashion a finished delash gear 140 thereon. A portion of the hub 142 supporting compliant teeth 26 is removed from delash gear 140 to provide a relief zone generally shown at 150 for increasing delash and compliance of the first spur gear and delash gear combination. Relief zone 150 is generally formed by machining, however, other suitable methods are contemplated, including, but not limited to, molding such a relief zone 150. In this manner, delash gear 120 is configured with a cantilever portion generally at 152 such that the delash gear teeth 26 aligned with cantilever portion 152 may be deflected toward rotation axis 17 at higher loads. Relief zone 150 provides a space for deflection of teeth 26 proximate cantilever portion 152.

It will be recognized that the phantom lines at 154 drawn with respect to the stiff and compliant gear portions 120 and 140, respectively, represent respective teeth portions cut by a hob cutter (not shown). More specifically, it will be recognized that the phantom lines 154 illustrate where the hob cutter is relieved proximate a free face of delash gear 140 and approaches the stiff teeth 24 profile as the hob cutter approaches metal gear 120 to cut teeth 24 therein.

It will also be recognized by one skilled in the pertinent art that spur gear 120 and delash gear 140 may be separately formed and then aligned with each other using dowel pins or alignment features on the spur gear 120 to properly align teeth 24 of gear 120 with teeth 26 of gear 140 and then mechanically, thermally, or chemically bonded together. In one embodiment for example, delash gear 140 may be heat staked to spur gear 120 before or after cutting teeth 24 and 26 with the hob cutter.

One implementation for the resulting spur gear assemblies 10 and 100 manufactured by the above described methods is in a differential gear set of an active steering system actuator as disclosed in U.S. patent application Ser. No. 10/869,249, now U.S. Pat. No. 7,063,636, entitled Mechanically Linked Active Steering System, also filed Jun. 15, 2004 and incorporated herein by reference in its entirety.

Referring to FIGS. 5-8, an alternative embodiment of delash gear 14 will be described. In particular, the figures illustrates a delash gear arrangement 200, which includes both delash gear 14 and a mounting piece, which is illustrated as bearing 18. Delash gear 14 and bearing 18 can be fabricated separately and then attached or fastened to each other. In addition, delash gear 14 and bearing 18 may be fabricated together. If delash gear 14 and bearing 18 are separately fabricated, they can also be fabricated from different materials. However, when delash gear 14 and bearing 18 are fabricated together, there are fewer pieces and there is less handling of parts. It is also noted that it is possible for mounting piece to be a solid shank and not function as a bearing.

When delash gear 14 and bearing 18 are fabricated together as one piece, delash gear arrangement 200 is fabricated from a compliant material. As explained above, the compliant material may be a polyamide or a nylon. In an exemplary embodiment, PolyEtherEtherKetone (PEEK) is utilized for its known high temperature properties and or high temperature resiliency. However, other compliant materials are contemplated for use for delash gear arrangement 200, as long as the chosen material provides compliant properties. While it is not necessary for bearing 18 to be compliant, the materials selected for the compliant delash gear also serve to be an appropriate bearing material.

Spur gear 12 is then mounted on bearing 18, just as any gear is mounted to any bearing. In particular, spur gear 12 may be press fit to sleeve bearing 18 or may be press fit at only a remote end 204 from delash gear 14, which would provide additional compliance. The press fit provides axial retention of the assembly and transmits torque at low to moderate torque. The press fit interface also permits slip at high torques, well above normal operating magnitudes, to protect the delash gear arrangement 200 at excessive loads. When spur gear 12 is mounted to bearing 18, plurality of teeth 26 of delash gear 14 align with plurality of teeth 24 of spur gear 12.

Once delash gear arrangement 200 has been assembled, delash gear arrangement 200 functions in a similar manner to delash gear 14 and first spur gear 12, as shown in FIG. 1. Thus, delash gear arrangement 200 can be arranged with second spur gear 16 (see FIG. 1) to provide for gear assembly 10. In addition, delash gear arrangement 200 can also be arranged in a similar manner to gear assembly 100, as shown in FIG. 4. The difference between the two arrangements is that delash gear arrangement 200 provides for a simplified manufacturing process.

The manufacturing of delash gear arrangement 200 can be accomplished in a variety of ways. First, delash gear 14 and bearing 18 may be machined from a bar of stock. Second, plurality of teeth 26 of delash gear 14 may be machined onto a flange-type detail, which has been molded onto bearing 18. Third, delash gear arrangement 200 may be a molded item.

The delash gear arrangement 200 allows for one component to provide both the delashing and the bearing functions for the gear assembly. Satisfying the bearing and delashing functions in a single component allows for lower assembly costs, fewer and simpler machined interfaces and overall lower product costs without adversely affecting the desired performance.

It will be appreciated that the use of first and second or other similar nomenclature for denoting similar items is not intended to specify or imply any particular order unless otherwise stated.

While preferred embodiments have been shown and described, various modifications and substitutions may be made thereto without departing from the spirit and scope of the invention, including the use of the geometries taught in other conventional worm/worm gear assemblies. Accordingly, it is to be understood that the apparatus and method have been described by way of illustration only, and such illustrations and embodiments as have been disclosed herein are not to be construed as limiting to the claims.

The invention claimed is:

1. A gear arrangement comprising:
   a first section having a first plurality of teeth, at least a portion of said first section is made of a compliant material;
   a second section having a second plurality of teeth, said second section is made of a stiff material, said first section is arranged axially adjacent to said second section, and each of said first plurality of teeth having a tooth flank that changes axially across said tooth flank relative to said second section such that said tooth flank changes in thickness in an axial direction.

2. The gear arrangement of claim 1, wherein said tooth flank changes axially due to a change in a helix angle in an axial direction and said toot flank changes axially such that said tooth flank changes in thickness in said axial direction.

3. The gear arrangement of claim 1, wherein said first section includes a relief zone configured to add compliance to said first section.

4. The gear arrangement of claim 1, further comprising a mounting piece disposed at an axis of rotation of said first section and said second section.

5. The gear arrangement of claim 4, wherein said mounting piece is a bearing.

6. The gear arrangement of claim 4, wherein said first section is coupled with said mounting piece, and said second section is mounted on said mounting piece.

7. The gear arrangement claim 6, wherein said second section is press fit at least partially onto said mounting piece.

8. The gear arrangement of claim 4, wherein said second section is arranged to rotationally slip on said mounting piece.

9. The gear arrangement of claim 4, wherein said first section and said mounting piece are fabricated together.

10. The gear arrangement of claim 4, wherein said mounting piece is made of said compliant material.

11. The gear arrangement of claim 1, wherein a first distance between each of said first plurality of teeth is less than a second distance between each of said second plurality of teeth.

12. The gear arrangement of claim 1, wherein said first section is mechanically coupled to said second section.

13. The gear arrangement of claim 1, wherein said first section is chemically coupled to said second section.

14. The gear arrangement of claim 1, wherein said first section is a first gear and said second section is a second gear.

15. The gear arrangement of claim 1, wherein said first section includes a delash gear having a body and a plurality of teeth extending from said body, and said second section includes a stiff gear.

\* \* \* \* \*